US012596583B2

(12) United States Patent
Nimmagadda et al.

(10) Patent No.: US 12,596,583 B2
(45) Date of Patent: Apr. 7, 2026

(54) COMPUTE AND MEMORY BASED ARTIFICIAL INTELLIGENCE MODEL PARTITIONING USING INTERMEDIATE REPRESENTATION

(71) Applicant: Intel Corporation, Santa Clara, CA (US)

(72) Inventors: Yamini Nimmagadda, Portland, OR (US); Suryaprakash Shanmugam, Santa Clara, CA (US); Akhila Vidiyala, Beaverton, OR (US); Divya Prakash, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1047 days.

(21) Appl. No.: 17/459,141

(22) Filed: Aug. 27, 2021

(65) Prior Publication Data

US 2021/0390460 A1 Dec. 16, 2021

(51) Int. Cl.
*G06N 20/00* (2019.01)
*G06F 9/50* (2006.01)
*G06F 18/20* (2023.01)
*G06F 18/21* (2023.01)

(52) U.S. Cl.
CPC .......... *G06F 9/5044* (2013.01); *G06F 9/5016* (2013.01); *G06F 9/5061* (2013.01); *G06F 18/2163* (2023.01); *G06F 18/29* (2023.01); *G06N 20/00* (2019.01)

(58) Field of Classification Search
CPC ...... G06F 9/0544; G06F 18/29; G06F 9/5016; G06F 9/5061; G06N 20/00
See application file for complete search history.

(56) References Cited

U.S. PATENT DOCUMENTS

| | | | | |
|---|---|---|---|---|
| 7,458,050 B1 * | 11/2008 | Arbel | .................... | G06F 30/327 |
| | | | | 716/125 |
| 11,704,161 B2 * | 7/2023 | Liu | ........................... | G06F 9/52 |
| | | | | 718/104 |
| 2022/0012607 A1 * | 1/2022 | Liu | ....................... | G06F 9/5044 |

* cited by examiner

*Primary Examiner* — Li Wu Chang
(74) *Attorney, Agent, or Firm* — Nicholson De Vos Webster & Elliott LLP

(57) ABSTRACT

Systems, apparatuses and methods include technology that converts an artificial intelligence (AI) model graph into an intermediate representation. The technology partitions the intermediate representation of the AI model graph into a plurality of subgraphs based on computations associated with the AI model graph, each subgraph being associated with one or more memory resources and one or more of a plurality of hardware devices. The technology determines whether to readjust the plurality of subgraphs based on the memory resources associated with the plurality of subgraphs and memory capacities of the plurality of hardware devices.

17 Claims, 11 Drawing Sheets

FIG. 1

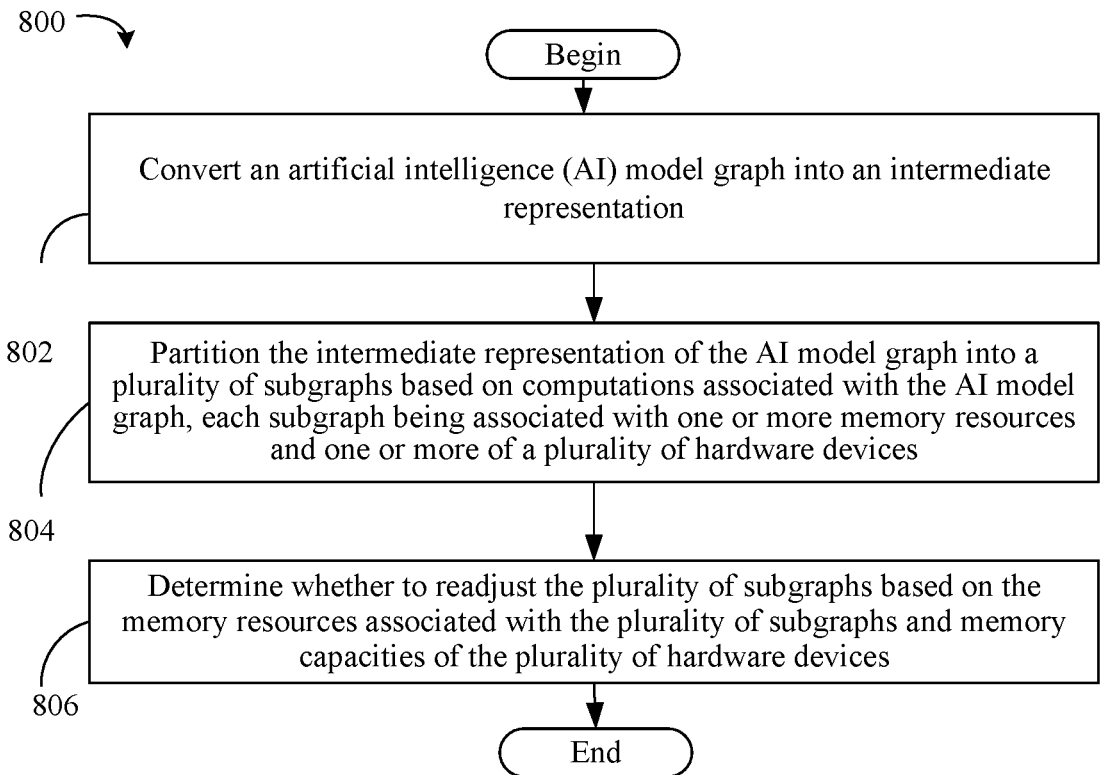

800

Begin

Convert an artificial intelligence (AI) model graph into an intermediate representation

802

Partition the intermediate representation of the AI model graph into a plurality of subgraphs based on computations associated with the AI model graph, each subgraph being associated with one or more memory resources and one or more of a plurality of hardware devices

804

Determine whether to readjust the plurality of subgraphs based on the memory resources associated with the plurality of subgraphs and memory capacities of the plurality of hardware devices

806

End

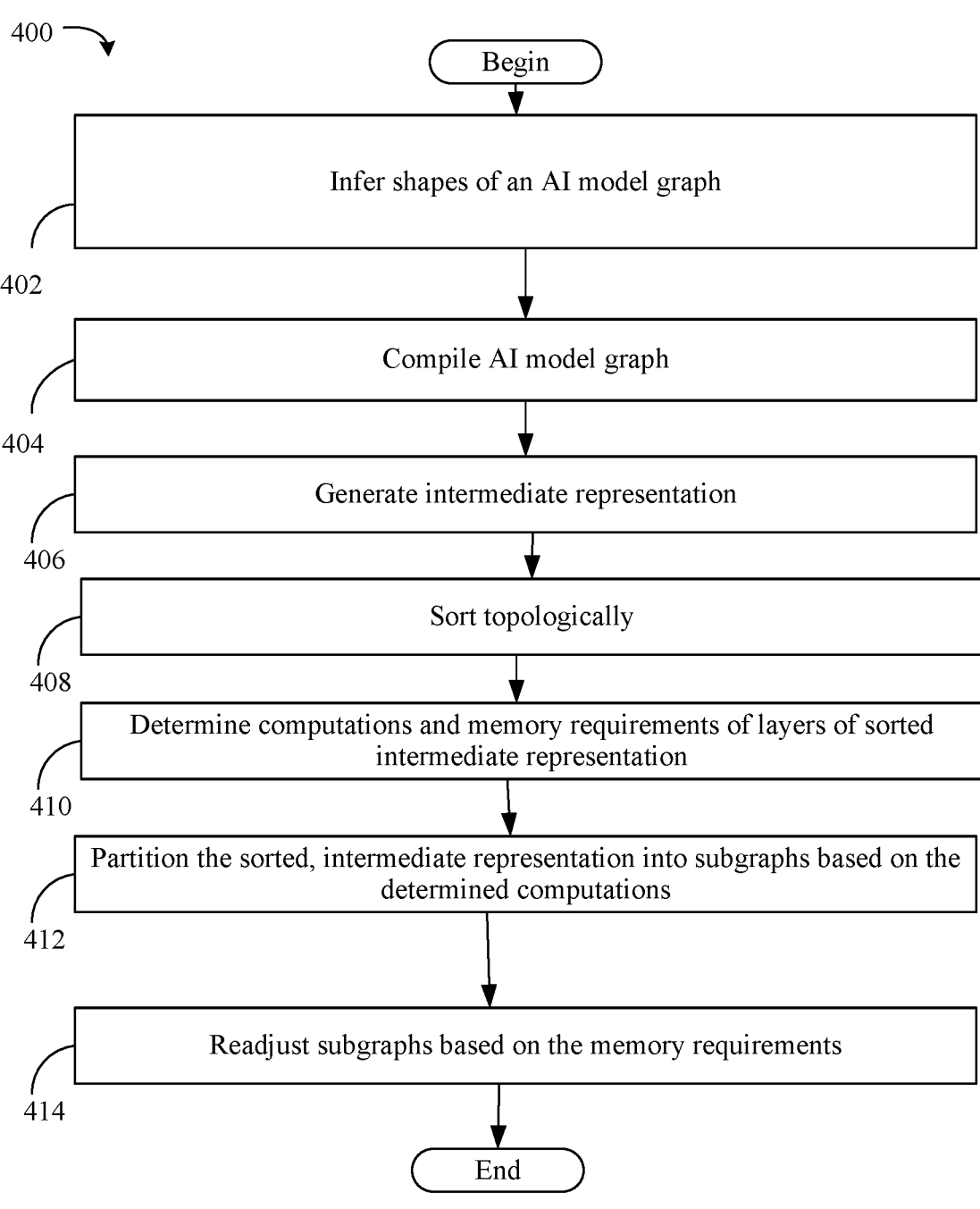

Begin

Infer shapes of an AI model graph

402

Compile AI model graph

404

Generate intermediate representation

406

Sort topologically

408

Determine computations and memory requirements of layers of sorted intermediate representation

410

Partition the sorted, intermediate representation into subgraphs based on the determined computations

412

Readjust subgraphs based on the memory requirements

414

End

FIG. 4

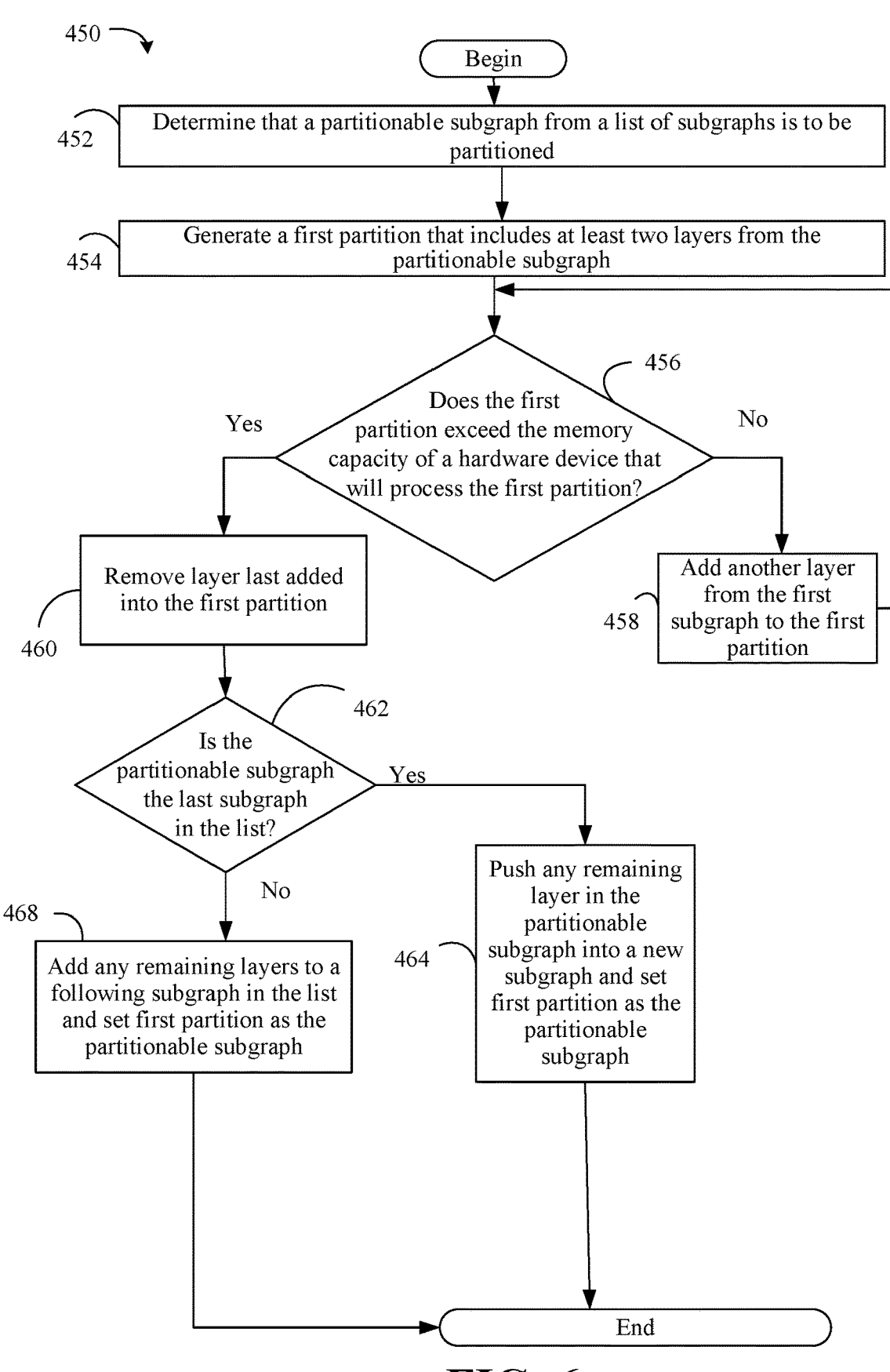

450

Begin

452  Determine that a partitionable subgraph from a list of subgraphs is to be partitioned 454  Generate a first partition that includes at least two layers from the partitionable subgraph 456  Does the first partition exceed the memory capacity of a hardware device that will process the first partition?

Yes                    No

460  Remove layer last added into the first partition

458  Add another layer from the first subgraph to the first partition

462  Is the partitionable subgraph the last subgraph in the list?

Yes

No

468  Add any remaining layers to a following subgraph in the list and set first partition as the partitionable subgraph 464  Push any remaining layer in the partitionable subgraph into a new subgraph and set first partition as the partitionable subgraph End

FIG. 6

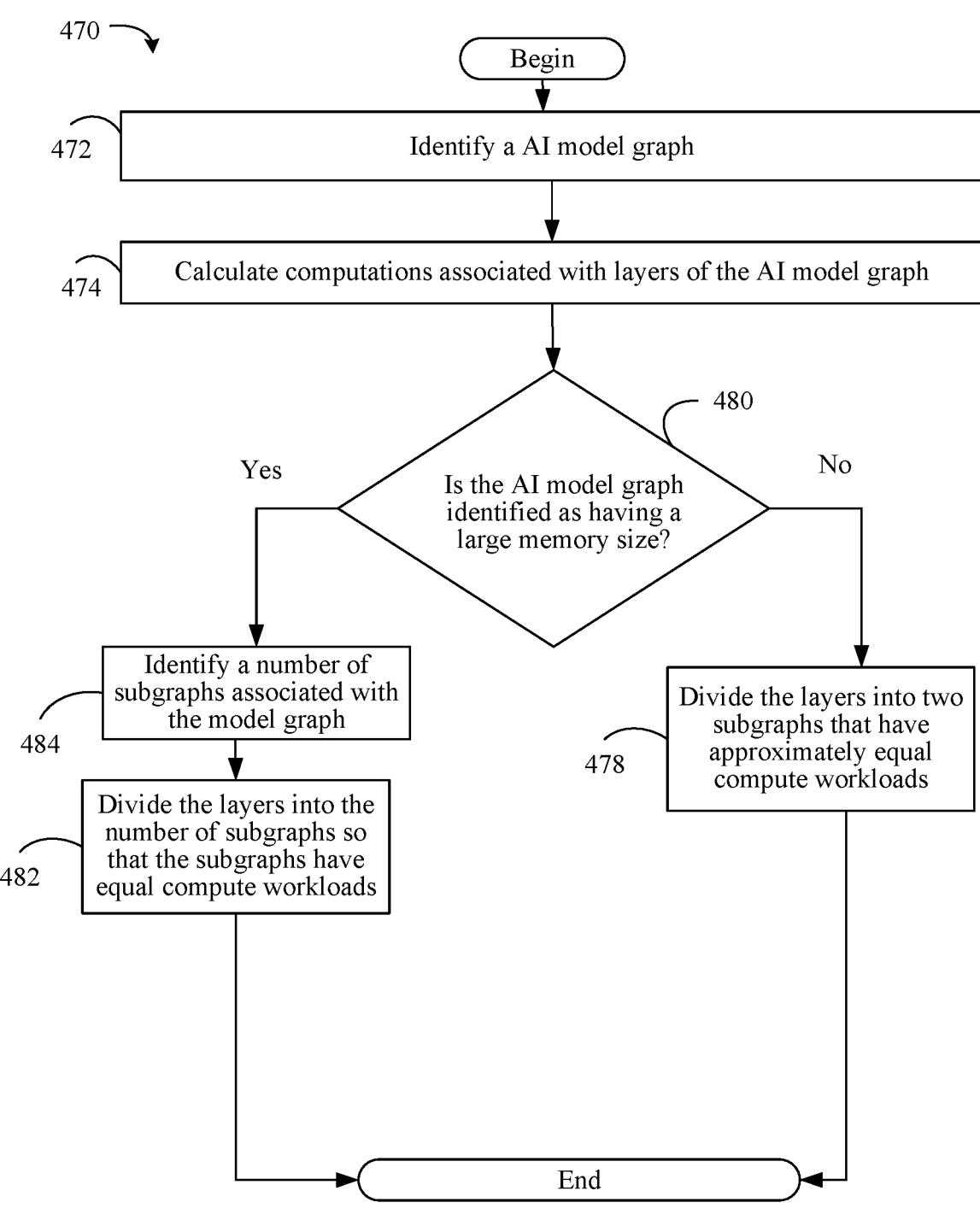

470

Begin

472    Identify a AI model graph

474    Calculate computations associated with layers of the AI model graph

480

Yes

Is the AI model graph identified as having a large memory size?

No

484    Identify a number of subgraphs associated with the model graph

482    Divide the layers into the number of subgraphs so that the subgraphs have equal compute workloads 478    Divide the layers into two subgraphs that have approximately equal compute workloads End

FIG. 7

COMPUTE AND MEMORY BASED ARTIFICIAL INTELLIGENCE MODEL PARTITIONING USING INTERMEDIATE REPRESENTATION

CROSS-REFERENCE TO RELATED APPLICATION

The present application claims the benefit of priority to Indian Patent Application No. 202141026228, filed on Jun. 12, 2021.

TECHNICAL FIELD

Embodiments generally relate to processing architectures that execute artificial intelligence (AI) processing. More particularly, embodiments relate to partitioning of an AI model into subgraphs based on computational workloads of the AI model, and modifying the subgraphs based on memory resources associated with the subgraphs.

BACKGROUND

AI models are increasingly becoming complex with large weights and activation tensor sizes (e.g., Natural Language Processing models like BERT, Optical flow models, etc.). Edge devices may have diminished memory and compute power compared to robust platforms (e.g., servers). Due to the constraints of edge devices, AI workloads that execute on the edge devices may sub-optimally operate inefficiently with high latency, poor performance. For example, some models may not fit in the local memory of accelerators and/or edge nodes increasing communicational overhead and degrading performance.

BRIEF DESCRIPTION OF THE DRAWINGS

The various advantages of the embodiments will become apparent to one skilled in the art by reading the following specification and appended claims, and by referencing the following drawings, in which:

FIG. 1 is a block diagram of an example of a block an AI framework integration system according to an embodiment;

FIG. 3 is a flowchart of an example of a method of memory and compute based subgraph partitioning according to an embodiment;

FIG. 4 is a flowchart of an example of a method of partitioning according to an embodiment;

FIG. 6 is a flowchart of an example of a method of reducing a size of a subgraph according to an embodiment;

FIG. 7 is a flowchart of an example of a method of generating subgraphs based on compute analysis according to an embodiment;

DESCRIPTION OF EMBODIMENTS

Figure 2A:
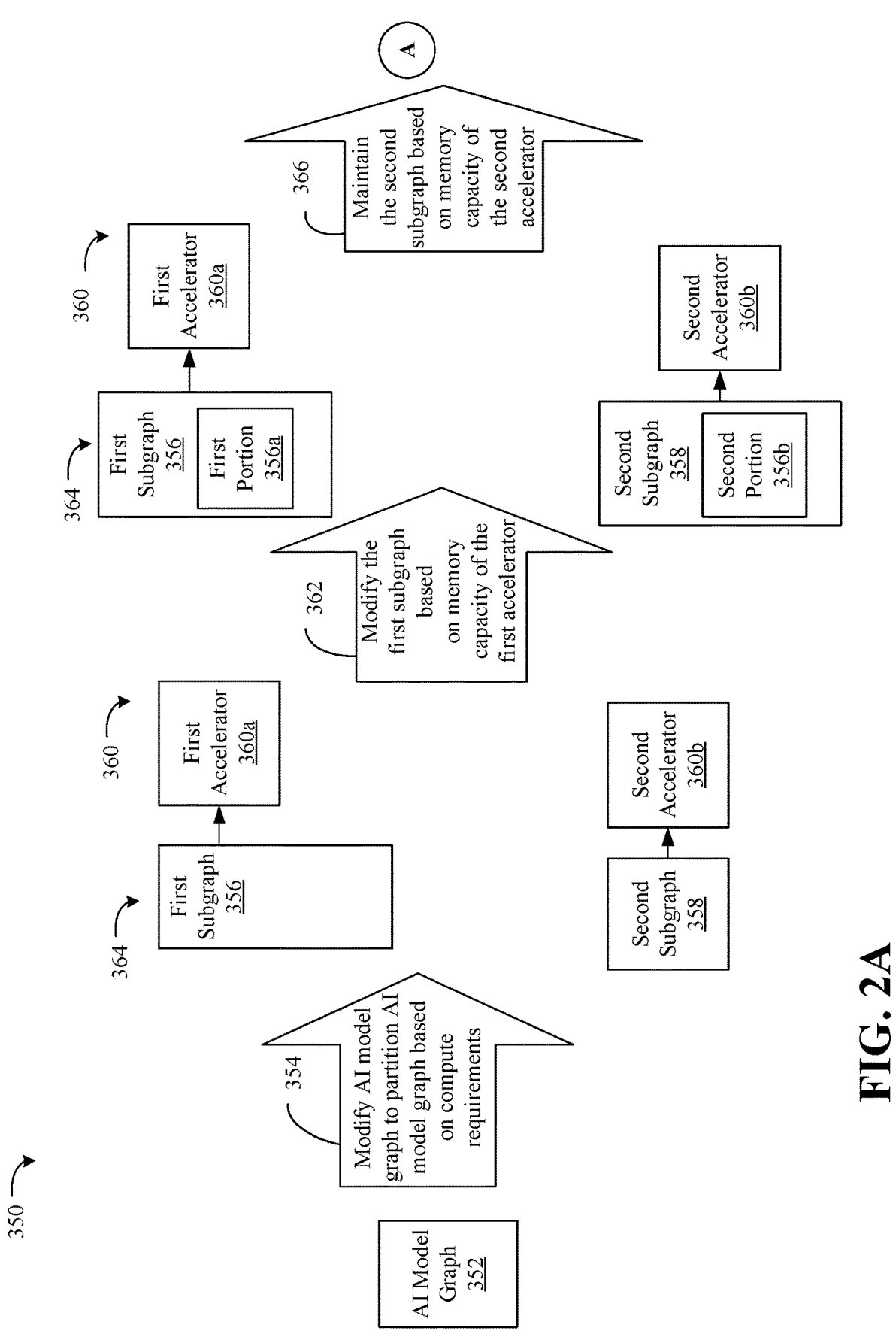
FIGS. 2A-2B are a diagram of an example of a process to generate subgraphs with a local-search strategy process according to an embodiment.

Some embodiments analyze and partition an AI model based on characteristics of the AI model. For example, some embodiments convert an AI model graph of the AI model into an intermediate representation (IR) of the model graph following target-independent graph enhancements, characterize the compute present in each layer (which corresponds to a node of an AI model graph) of the IR, and characterize memory resources that each layer may require (e.g., intermediate output data sizes of the layers). Embodiments as described herein may partition the IR of the AI model graph into subgraphs based on the characterized compute and memory resources across heterogeneous devices in a lightweight manner to achieve an efficient partitioning of the AI model graph based on a local search strategy.

As noted, the compute and memory resources and decisions may be made on the IR of the AI model graph to enhance execution and the ability for various architectures to implement the subgraphs (e.g., enhance "stickiness" to various architectures). An IR may be a source and target independent representation of the AI model graph (which originally may be in a source dependent format) that is an abstract machine language. An AI model may originally be in a format that is specific to a framework (e.g., TensorFlow, PyTorch, etc.). A target format may be a hardware specific format. The IR of the AI model graph may be independent of both source and target formats. That is, embodiments as described herein provide an intelligent memory and compute based partitioning of AI models based on multiple criteria (e.g., compute of the model, model size, intermediate data transfer size between edge nodes and/or hardware devices, etc.) leading to better overall performance, more efficient computing resource utilization and lower latency.

Other conventional implementations may employ resource intensive approaches (e.g., greedy search) and/or approaches that fail to balance computations across heterogeneous devices and may not consider the limited compute and memory resources associated with edge devices. Moreover, other conventional implementations may not efficiently and/or heterogeneously partition a model based on multiple criteria (e.g., compute of the model, model size, intermediate data transfer size, etc.) relying on full instances of the AI model inefficiently executing in parallel on different hardware devices (e.g., central processing unit and graphics processing unit, etc.).

Embodiments as described herein divide an IR of an AI model graph into partitions (which may also be referred to as subgraphs) that are suitable for heterogeneous edge devices while also enhancing execution. For example, some embodiments may achieve load balancing by distributing AI workloads in a balanced manner across subgraphs. Moreover, some embodiments further distribute AI workloads to the subgraphs based on memory overhead.

In embodiments as described herein, an AI model graph (or IR of the AI model graph) may be partitioned based on computations and required memory resources of the AI model graph as well as supported computations and memory capacities of edge devices to reduce network communication and load balance. For example, even if an entire AI model is able to be stored in a memory of an accelerator at a same time, the latency to compile a sizeable AI model and load the AI model weights in the accelerator may result in a high latency process. Thus, the AI model may be partitioned, and the partitioned model may be executed in multiple heterogeneous accelerators present on the same edge node or different edge nodes. When the AI model is partitioned across different edge nodes in an edge cluster, there may be a data transfer overhead as the data may need to be transferred between the different edge nodes across the network. Some embodiments may thus execute a memory based analysis to reduce the data transfer overhead.

Figure 1:
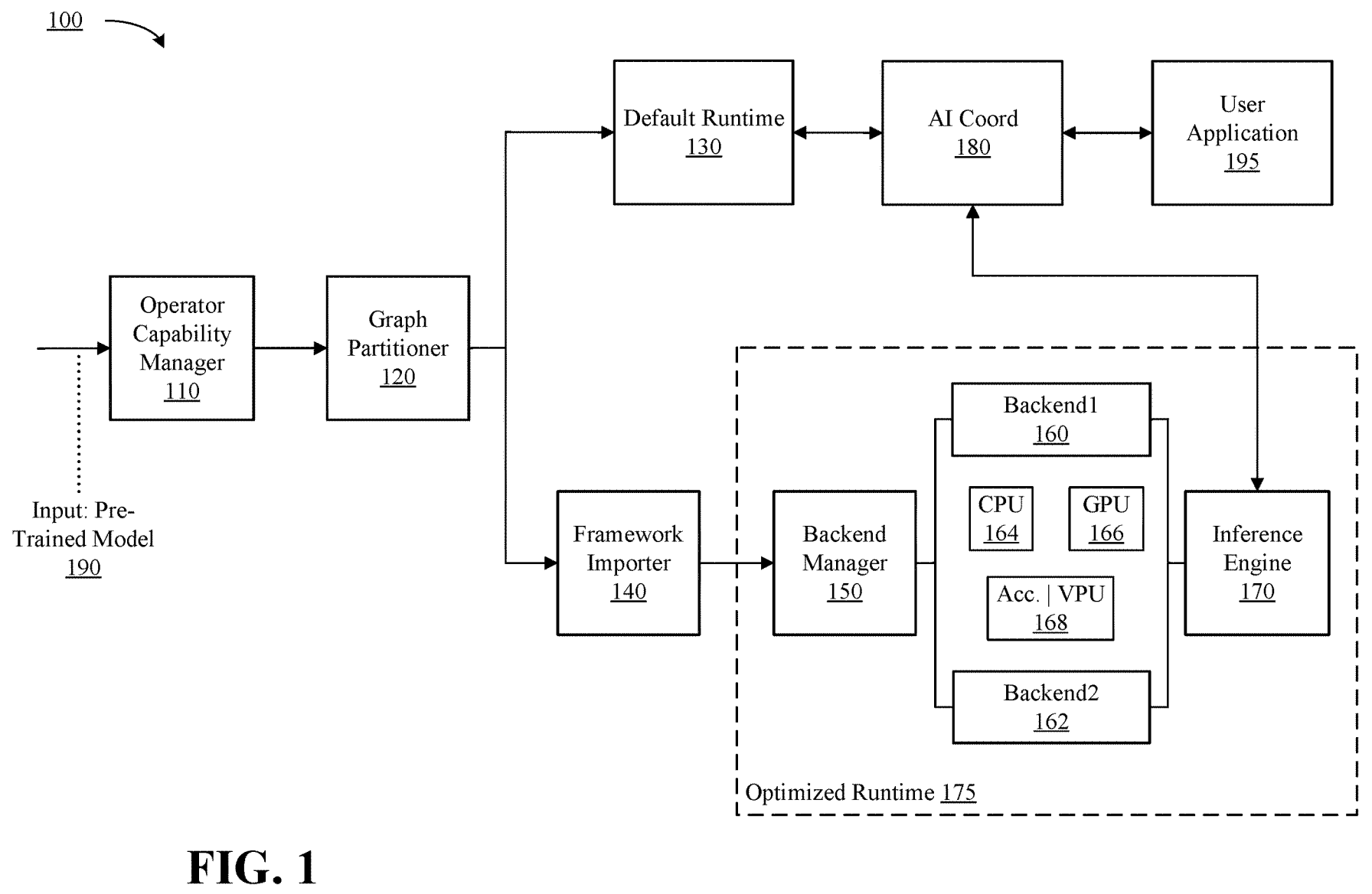

Turning now to FIG. 1 provides a block diagram illustrating an example of an AI framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a CPU 164, a GPU 166, and a hardware accelerator such as a VPU (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 may be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g. mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types (e.g., precision data types), and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an IR for these subgraphs, to be partitioned and interpreted (i.e., read/parsed) by the optimized runtime 175. The IR produces a structured data set comprising the model architecture, metadata, weights and biases.

The backend manager 150 receives the IR of the supported model subgraphs and applies optimization techniques to optimize execution of the model using available backends and hardware options. For example, the backend manager 150 can select among available backends, e.g., the backend1 160 or the backend2 162. In some embodiments, the backend1 160 represents a basic backend that is optimized for a particular group of hardware units. For example, where the optimized runtime 175 utilizes the Open Visual Inference and Neural network Optimization (OpenVINO) runtime technology, the backend1 160 can be the OpenVINO backend. In some embodiments, the backend2 162 can be a backend such as VAD-M, which is optimized for machine vision tasks using a VPU such as the Intel® Myriad X VPU. The selected backend compiles (via a compiler) supported subgraphs into executable code, and performs optimization. The backend manager 150 also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175.

Some or all components in the system 100 may be implemented using one or more of a CPU, a GPU, an AI accelerator, a FPGA accelerator, an ASIC, and/or via a processor with software, or in a combination of a processor with software and an FPGA or ASIC. More particularly, components of the system 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 100 may be written in any combination of one or more programming languages, including an object oriented programming language such as JAVA, SMALL-TALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2B:
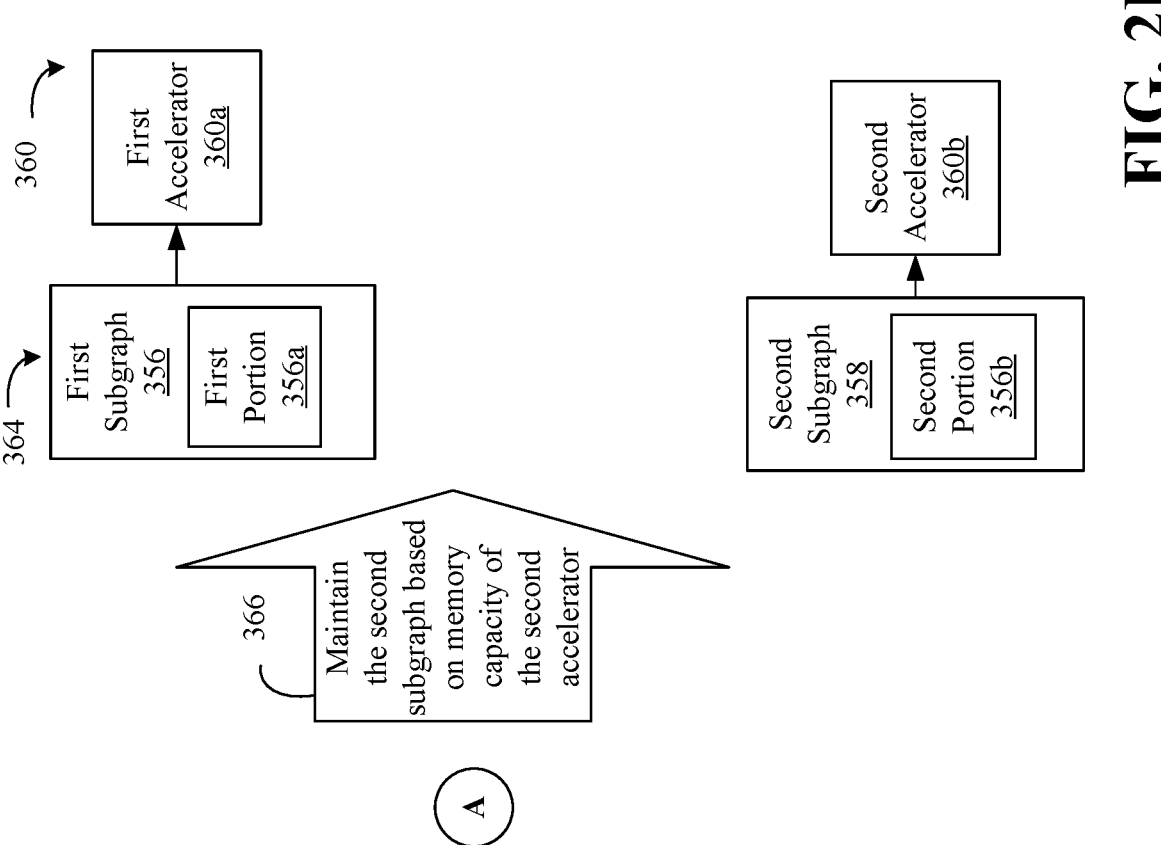

FIGS. 2A and 2B show an intelligent and enhanced local-search strategy process 350 of graph partitioning that identifies enhanced partitioning points or deep learning (DL) layers of an AI model at which an AI model may be partitioned into subgraphs. The local-search strategy process 350 may efficiently partition the AI model based on a memory and compute analysis described below. The AI model may initially be represented as the AI model graph 352.

The local-search strategy process 350 may modify the AI model graph 352 based on compute requirements 354 of the first accelerator 360a. For example, the process 350 may infer shapes associated with the AI model graph 352 to compute shapes of layers of the AI model graph 352 based on input data (e.g., an input data stream of images, words, etc. for classification) that will be processed by the AI model graph 352 to create a static model. The shape of input data refers to the dimensions of the input data. The dimensions of the input data are calculated using functions to read shape (e.g., numpy.shape( )). A model with dynamic input shapes may be generated when the model is to process data of any given input shape. Once the shape of the input data is known, the input layer of the model is assigned this shape and a static model is generated based on the shape. Similarly, all the shapes of the layers may be fully inferred based on input data to the layers. That is, each respective layer may have an associated shape that is determined based on input data that the respective layer is to process. The static model may then be compiled with a graph compiler (Ex: nGraph Compiler stack, OpenVINO nGraph, etc.) to perform target independent optimizations. For example, the graph compiler may execute optimizations on the static model such as operator fusions, redundant/training operator removal, batchnorm folding may be executed. The compiled graph may then be converted to an IR using an online mode (e.g., using nGraph importers in OpenVINO) or an offline mode (e.g., using Model Optimizer).

In some embodiments, the local-search strategy process 350 analyzes the IR for any cycles. A cycle may be a trail (a non-empty trail) in which a first and last vertices are repeated (the same) and the only repeated vertices are the first and last vertices. The cycles are unrolled (e.g., to remove all cycles and generate a tree structure within the IR) using new placeholder operators to generate a directed acyclic graph (that corresponds to the AI model) that represents the AI model graph 352. The directed acyclic graph is then sorted topologically and read operator by operator.

The process 350 may then estimate the computation present in each operator of the sorted, directed, acyclic graph (e.g., an amount of computations of each operator). For example, the process 350 may identify Floating-Point Operations (FLOPS) and/or teraflops (TLOPS) associated with each operator (e.g., Convolution, Gemm, Fully Connected, MatMul, etc.). For example, a computational estimation for a convolution operator is provided by the following Equation:

$$\text{Convolution op count}=(C_{in}*K_x*K_y*\text{input}_w*\text{input}_h*C_{out})/\text{Stride} \quad \text{Equation I}$$

In Equation I, $C_{in}$ is a number of input channels of the convolution operator. The variables ($K_x$, $K_y$) are a kernel size of the convolutional operator in an x dimension and y dimension. ($\text{input}_w$, $\text{input}_h$) is a resolution of an image to be processed by the convolutional operator and represents the width and height of the image. $C_{out}$ is the number of output channels of the convolutional operator. Stride is a step size that a filter of the convolutional operator uses to slide through and process the image on a slide-by-slide basis. The convolutional op count is the computational estimation of the convolution operator. Each of the operators of the AI model graph 352 may similarly be analyzed to determine a computational estimation of the operator. As another example, a computational estimation for a Pool operator is provided by the following equation:

$$\text{Pool op count}=\text{input}_w*\text{input}_h*C_{out} \quad \text{Equation II}$$

In Equation II, ($\text{input}_w$, $\text{input}_h$) is a resolution of an image to be processed by the pool operator and represents the width and height of the image. $C_{out}$ is the number of output channels of the pool operator. A computational estimation for other operators may be similarly determined based on the characteristics identified above.

As noted, the process 350 may partition the IR of the AI model graph 352 based on the computational estimates of the operators. In some examples, the process 350 identifies output data sizes of each operator in the directed acyclic graph and computes memory requirements (e.g., memory resources) of each operator (e.g., how much memory the operator will need during execution, a size of vectors, weights biases, output data sizes of the operator, etc.).

Based on the above, the AI model graph 352 is modified and partitioned. For example, the process 350 may partition the IR of the AI model graph 352 to load balance between subgraphs. For example, Pseudocode I below partitions the IR of the AI model graph 352 based on a total computation workload of the intermediate representation of the AI model graph 352.

| Pseudocode I |
| --- |

```
subgraph_partition(num_partitions):
F_total = 0 // Initialize a total number of FLOPs of the AI model graph
for each layer L in layers_total:
    F_L = calculate flops(L)
    F_total = F_total + F_L
start_layer = 0
for each partition p in num_partitions:
    subgraphs[p] = { } // start with an empty subgraph
    F_subgraph[p] = 0 // Initialize the flops of the subgraph to zero
    for each layer L in range (start_layer, layers total):
        while (F_subgraph[p] <= F_total/num partitions):
            subgraphs[p] = add_layer(subgraphs[p], L)
    start_layer = L + 1
return subgraphs
```

Execution of Pseudocode I causes a determination of the total compute workload (e.g., total number of FLOPs) of the IR of the AI model graph 352. Execution of Pseudocode I then divides the IR to generate the partitions to include layers of the IR of the AI model graph 352. That is, execution of Pseudocode I generates each respective partition (which is a subgraph) in turn from the IR, and adds more layers into the respective partition until the partition has a compute workload that is roughly equal to the total compute workload (e.g., total flops) divided by the number of partitions. The number of partitions is an input into Pseudocode I, and may be set based on a computational amount and/or memory size of the AI model graph 352, or based on a type of the AI model graph 352 (e.g., certain AI models may have a larger number of partitions as the AI models may be larger in memory size and/or have increased computations). The input however may default to two in the absence of the computational amount meeting a threshold, the size meeting a threshold and/or the type corresponding to a larger sized model.

A layer in the IR corresponds to a node in the AI model graph 352. For example, a node in the AI model graph 352 also be referred to as a layer. As one example, each layer may be the representation of a DL operator type in the AI model graph 352 with a specific set of attributes and weights. For example, the IR may include a series of layers "conv1 to conv2 to pool1 to softmax." In this case, conv1, conv2, pool1, softmax are layers or nodes in the AI model graph 352. Conv1 and conv2 layers are derived from a type of operator known as the "convolution" operator. Conv1 and conv2 each include specific (and different) attributes and weights. Embodiments may determine the FLOPS and/or TOPS of each operator. For each layer, some embodiments utilize and substitute the values specific to that layer to calculate FLOPS.

As illustrated, the process 350 generates subgraphs 364 including a first subgraph 356 and a second subgraph 358. The first and second subgraphs 356, 358 represent the AI model graph 352 and the AI model. The first and second subgraphs 356, 358 are IRs of the AI model graph 352. The first subgraph 356 may have an approximately equal compute workload as the second subgraph 358. The first subgraph 356 and the second subgraph 358 may be scheduled to execute on accelerators 360. For example, the process 350 may schedule the first subgraph 356 to execute on the first accelerator 360a, and the second subgraph 358 on the second accelerator 360b.

The process 350 modifies the first subgraph 356 based on a memory capacity of the first accelerator 360a, 362. That is, the process 350 modifies the first subgraph 356 based on memory resources (e.g., size of weights and activation tensor sizes) required by the first subgraph 356 and a memory capacity of a first accelerator 360a. The memory resources required by the first subgraph 356 may be compared to the memory capacity of the first accelerator 360a. In this embodiment, the process 350 determines that the memory resources required by the first subgraph 356 exceeds the memory capacity of the first accelerator 360a. Thus, if the entire first subgraph 356 were to execute on the first accelerator 360a, communicational costs and latency would be increased since not all of the data needed for execution is able to be simultaneously stored in the first accelerator 360a, resulting in high latency data retrieval from long-term storage. To avoid such communicational processing and latency costs, the first subgraph 356 may be readjusted and modified to reduce the memory requirements of the first subgraph 356.

In this embodiment, the process 350 retains a maximum amount of layers of the first subgraph 356 that have a total memory resource requirement less than the memory capacity of the first accelerator 360a. For example, the process 350 iteratively populates and analyzes layers from a beginning of the first subgraph 356 towards the end of the first subgraph 356 calculating the additional memory resources needed by each layer. The process 350 may maintain a running counter of the total memory resources needed by the layers that are populated and analyzed thus far. The process 350 analyzes and adds layers until a layer is reached that causes the running counter (which corresponds to a total size of all analyzed layers) to be more than the maximum memory capacity of the first accelerator 306a. When the running counter exceeds the memory capacity of the first accelerator 306a, the last analyzed layer, which caused the running counter to exceed the memory capacity of the first accelerator 306a, and all remaining layers in the first subgraph 356 may be pushed into a following subgraph. The following subgraph in this example is the second subgraph 358.

In this embodiment, a first portion 356a of the first subgraph 356 is maintained as part of the first subgraph 356. The first portion 356a may include a maximum amount of layers that have memory resource requirements less than the memory capacity of the first accelerator 360a. In contrast, a second portion 356b from the first subgraph 356 are reassigned and pushed into the second subgraph 358 for execution. Thus, the second portion 356b is removed from the first subgraph 356 and added to the second subgraph 358. After doing so, the process 350 may maintain the second subgraph 358 based on the memory capacity of the second accelerator 360b, 366. That is, the process 350 verifies that the memory resources required by the second subgraph 358, which includes the second portion 356b, are less than the memory capacity of the second accelerator 360b.

In detail, the memory resources required by the second subgraph 358 may be compared to the memory capacity of the second accelerator 360b. In this embodiment, the memory resources required by the second subgraph 358 may be less than the memory capacity of the second accelerator 360b. That is, all the data needed for execution of the second subgraph 358 may be stored at a same time in the memory of the second accelerator 360b. Thus, the data needed for execution may be stored in the second accelerator 360b, and thereafter the second subgraph 358 may efficiently execute without lengthy data fetches from external memory storage. Thus, the process 350 maintains the second subgraph 358 without modification and to include the second portion 356b as illustrated in FIG. 2B.

If, hypothetically, memory resources of the second subgraph 358 were greater than the memory capacity of the second accelerator 360b, the process 350 may remove layers from the second subgraph 358 and add the removed layers to a new partition until the memory resources of the second subgraph 358 are less than the memory capacity of the second accelerator 360b. The new partition may be scheduled to execute on a different accelerator (unillustrated).

Thus, as noted above embodiments as described herein distribute AI workloads to achieve load balancing. Moreover, the AI workload memory resource requirements may be analyzed and compared to memory capacities of hardware devices. Based on as much, the AI workloads may be redistributed.

FIG. 3 shows a method 800 of memory and compute based subgraph partitioning. The method 800 may generally be implemented with the embodiments described herein, for example, the system 100 (FIG. 1) and/or the process 350 (FIGS. 2A-2B), already discussed. In an embodiment, the method 800 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 802 converts an artificial intelligence (AI) model graph into an intermediate representation. Illustrated processing block 804 partitions the intermediate representation of the AI model graph into a plurality of subgraphs based on computations associated with the AI model graph, each subgraph being associated with one or more memory resources and one or more of a plurality of hardware devices. Illustrated processing block 806 determines whether to readjust the plurality of subgraphs based on the memory resources associated with the plurality of subgraphs and memory capacities of the plurality of hardware devices.

In some embodiments, method 800 further includes translating the AI model graph from a source dependent format to a source independent format to generate the intermediate representation, where the intermediate representation is in a hardware independent format. In some embodiments, the method 800 includes determining the computations and the memory resources of the plurality of subgraphs based on a plurality of layers identified from the intermediate representation.

In some embodiments, method 800 further identifies memory resources associated with execution of a first subgraph of the plurality of subgraphs, identifies a first hardware device from the plurality of hardware devices that is scheduled to execute the first subgraph, and reduces the first subgraph based on the memory resources of the first subgraph being determined to exceed a first memory capacity of the first hardware device. In such embodiments, method 800 further determines a first portion of the first subgraph that has memory resources less than or equal to the first memory capacity, removes a second portion of the first subgraph from the first subgraph, and adds the second portion to a second subgraph of the plurality of subgraphs.

In some embodiments, method 800 identifies a total compute workload of the AI model graph based on the computations associated with the AI model graph, identifies a compute value based on the total compute workload of the AI model graph divided by a total number of the plurality of subgraphs, and iteratively add layers to each respective subgraph of the plurality of subgraphs while a total compute workload of the respective subgraph is less than the compute value.

FIG. 4 illustrates a partitioning method 400 to partition an AI model graph based on compute and memory analysis. The method 400 may generally be implemented with the embodiments described herein, for example, the system 100 (FIG. 1), the process 350 (FIGS. 2A-2B), and/or method 800 already discussed. The method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 infers shapes of an AI model graph. For example, process block 402 identifies input data associated with the AI model graph to determine shapes of the AI model graph. Illustrated processing block generates a static model based on the inferred shapes. Illustrated processing 404 compiles the static model of the AI model graph to generate an optimized AI model graph. In some embodiments, processing block 404 executes optimizations such as fusions, redundant/training operator removal and/or batchnorm folding on the static model of the AI model graph to generate the optimized AI model graph.

Illustrated processing block 406 generates an IR of the optimized AI model graph. Illustrated processing block 408 sorts the IR topologically (e.g., analyzes for cycles and unrolls any cycles). Illustrated processing block 410 determines computations (e.g., FLOPS) and memory requirements (e.g., intermediate data sizes, size of weights and activation tensor sizes, etc.) of layers of the sorted IR. Illustrated processing block 412 partitions the sorted IR into subgraphs based on the determined computations.

Illustrated processing block 414 readjusts the subgraphs (e.g., partitions) based on the memory requirements. The subgraphs may be ordered according to execution (e.g., first subgraph is the first to execute from the subgraphs, second subgraph is the second to execute from the subgraphs, etc.). In detail, some embodiments analyze each respective subgraph and calculates the memory requirements (e.g., size of weights and activation tensor sizes of the layers) of the respective subgraph. If these values add up to more than a total memory capacity of an accelerator that is to execute the respective subgraph, the partition points are readjusted between subgraphs. For a respective subgraph with weight and activation tensor sizes greater than the memory capacity of the accelerator, some embodiments modify the respective subgraph to generate a modified respective subgraph by populating a maximum number of layers from the respective subgraph that has a memory size less than the memory capacity of the accelerator. For example, illustrated processing block 414 begins populating layers from the beginning of the respective subgraph until the maximum number of layers is reached. The remaining layers of the subgraph are removed from the respective subgraph and pushed into the next subgraph that follows the respective subgraph if the current subgraph is not the last subgraph. If the current subgraph is the last subgraph, then the number of subgraphs is incremented by one, and the above is repeated until embodiments find the best subgraphs of the model that are able to fit on edge accelerators.

Below is the Pseudocode II that describes part of the functions of processing block 414, and in particular the subgraph readjusting process after the weight and activation tensor size checks. In the below example, the "new subgraph" may be set and stored as the modified respective subgraph that has a memory resource usage less than the memory capacity.

---

Pseudo-code 2

---

```
adjust_subgraphs(subgraph, num_partitions):
for each partition p in num_partitions:
   mem_subgraph[p] = activation_tensor(subgraph[p]). size( )
+ weights(subgraph[p]).size( )
   if (mem_subgraph[p] > MEM_CAPACITY):
      new_subgraph[p] = { }
      mem_new_subgraph = 0
      for each layer L in subgraph[p]:
         while(mem_new_subgraph <
MEM_CAPACITY)
               new_subgraph[p] =
add_layer(new_subgraph[p], L)
      for each layer in range(L,
      subgraph[p].last_layer_index):
         if (p < num_partitions - 1):
            subgraph[p+1] =
            add_layer(sub_graph[p+1], L)
         else:
            num_partitions = num_partitions + 1
return subgraph, num_partitions
```

---

Processing block 414 may be readily implemented in conjunction with or as part of modifying the first subgraph 356 based on a memory capacity of the first accelerator 360a, 362 (FIG. 2A). Method 400 then completes.

Figure 5:
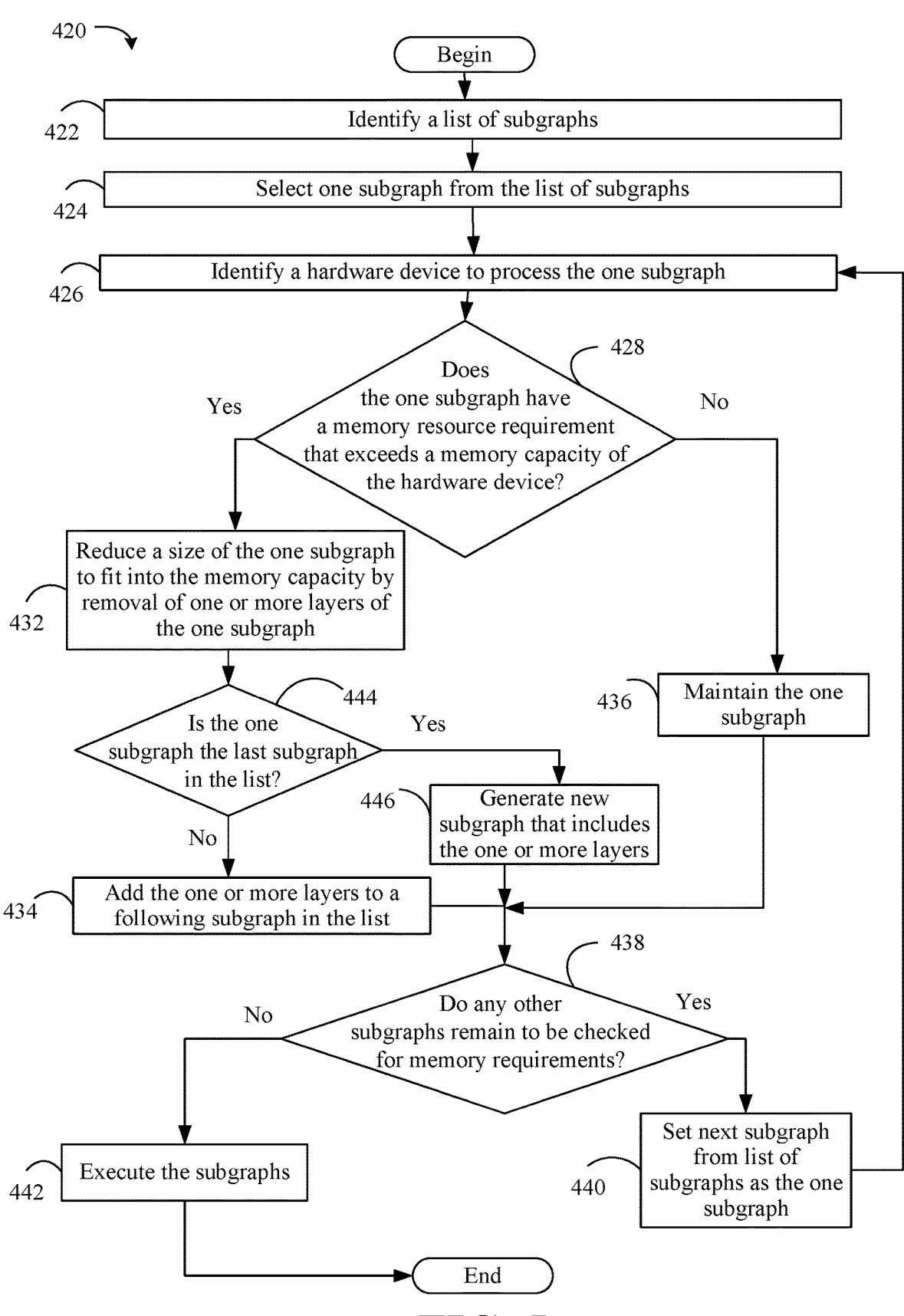
FIG. 5 is a flowchart of an example of a method of memory based subgraph repartitioning according to an embodiment.

FIG. 5 shows a method 420 of memory based subgraph repartitioning. The method 300 may generally be implemented with the embodiments described herein, for example, system 100 (FIG. 1), process 350 (FIGS. 2A-2B), method 800 (FIG. 3) and/or method 400 (FIG. 4) already discussed. The method 420 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 422 identifies a list of subgraphs. Illustrated processing 424 selects one subgraph from the list of subgraphs. Illustrated processing block 426 identifies a hardware device to process the one subgraph. Illustrated processing block 428 determines if the one subgraph has a memory resource requirement that exceeds a memory capacity of the hardware device. If not, illustrated processing block 436 maintains the one subgraph. If the memory resource requirement exceeds the memory capacity, illustrated processing block 432 reduces a size of the one subgraph to fit into the memory capacity by removal of one or more layers of the one subgraph. Illustrated processing block 444 determines if the one graph is the last subgraph in the list. If so, illustrated processing block 446 generates a new subgraph that includes the one or more layers removed from the one subgraph. Otherwise, illustrated processing block 434 adds the one or more layers to a following subgraph in the list. Illustrated processing block 438 determines if any other subgraphs remain to be checked for memory requirements. If so, illustrated processing block 440 sets a next subgraph from the list of subgraphs as the one subgraph. Otherwise, illustrated processing 442 executes the subgraphs and the method 420 completes.

FIG. 6 shows a method 450 of removing one or more layers from a subgraph. The method 450 may generally be implemented with the embodiments described herein, for example, the system 100 (FIG. 1), process 350 (FIGS. 2A-2B), method 800 (FIG. 3), method 400 (FIG. 4) and/or method 420 (FIG. 5) already discussed. The method 450 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 452 determines that a partitionable subgraph from a list of subgraphs is to be partitioned. Illustrated processing block 454 generates a first partition (e.g., subgraph) that includes at least two layers from the partitionable subgraph. Illustrated processing block 456 determines if the first partition exceeds the memory capacity of a hardware device that will process the first partition. If not, illustrated processing block 458 adds another layer from the first subgraph to the first partition. If so, illustrated processing block 460 removes the last layer added into the first partition. Illustrated processing block 462 determines if the partitionable subgraph is the last subgraph in the list. If so, illustrated processing block 464 pushes any remaining layers (that were not maintained as part of the first partition) in the partitionable subgraph into a new subgraph and sets the first partition as the partitionable subgraph. Otherwise, illustrated processing block 468 adds any remaining layers to a following subgraph in the list and sets first partition as the partitionable subgraph.

FIG. 7 shows a method 470 of generating subgraphs based on compute analysis. The method 470 may generally be implemented with the embodiments described herein, for example, the system 100 (FIG. 1), process 350 (FIGS. 2A-2B), method 800 (FIG. 3), method 400 (FIG. 4), method 420 (FIG. 5) and/or method 450 (FIG. 6) already discussed. The method 470 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 472 identifies an AI model graph. Illustrated processing block 474 calculates computations associated with layers of the AI model graph. Illustrated processing block 480 determines if the AI model graph is identified as having a large memory size. For example, a type of the AI model graph may be compared to a list of known types of AI model graphs that have large memory requirements. If the type of the AI model graph is in the list, the AI model graph may be determined to have a large memory size. As another example, a memory resource requirement of the AI model graph may be calculated. If the memory resource requirement is above a threshold, the AI model graph is determined to have a large memory size.

If the AI model graph is identified as having a large memory size, illustrated processing block 484 identifies a number of subgraphs associated with the model graph. For example, illustrated processing block 482 identifies an appropriate number (which is greater than two) of subgraphs from a lookup table and based on the type of the AI model graph. Some examples include determining the number of subgraphs based on the memory size of the AI model graph and so as to ensure that each subgraph has a memory size less than a threshold. Illustrated processing block 482 divides the layers into the number of subgraphs so that the subgraphs have equal compute workloads. If the AI model graph is identified as not having a large memory size, illustrated processing block 478 divides the layers into two subgraphs that have approximately equal compute workloads.

Figures 8, 9:
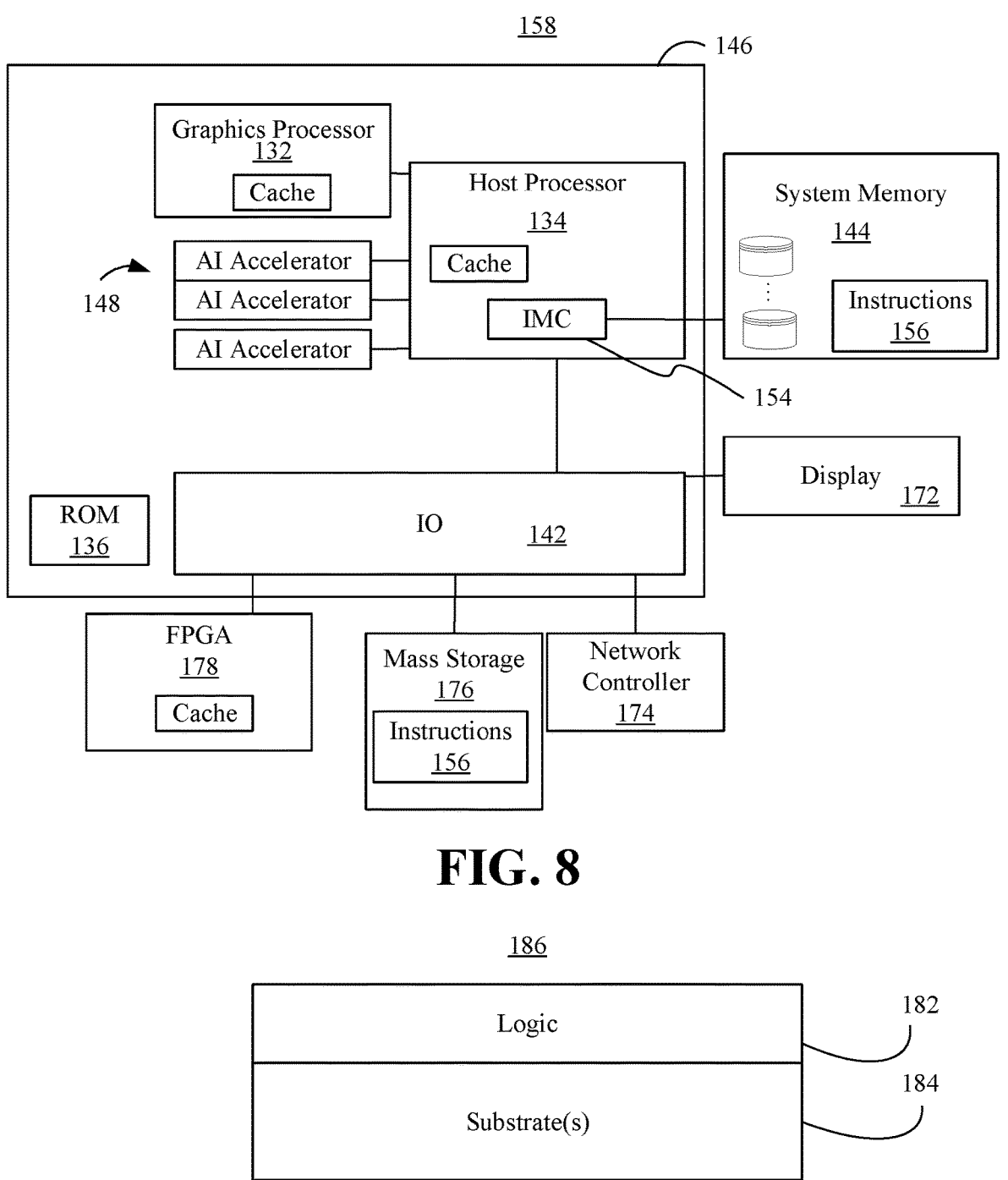
FIG. 8 is a block diagram of an example of an AI model partitioning computing system according to an embodiment.
FIG. 9 is an illustration of an example of a semiconductor apparatus according to an embodiment.

Turning now to FIG. 8, a performance enhanced computing system 158 is shown. The system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 158 includes a host processor 134 (e.g., CPU) having an integrated memory controller (IMC) 154 that is coupled to a system memory 144.

The illustrated system 158 also includes an input output (10) module 142 implemented together with the host processor 134, a graphics processor 132 (e.g., GPU), ROM 136, and an array of heterogeneous AI accelerators 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). Furthermore, the SoC 146 may further include processors (not shown) and/or the AI accelerator 148 dedicated to artificial intelligence (AI) and/or neural network (NN) processing. For example, the system SoC 146 may include vision processing units (VPUs) and/or other AI/NN-specific processors such as AI accelerators 148, etc. In some embodiments, any aspect of the embodiments described herein may be implemented in the processors and/or accelerators dedicated to AI and/or NN processing such as the AI accelerators 148, the graphics processor 132 and/or the host processor 134. The system 158 may communicate with one or more edge nodes through the network controller 174.

The graphics processor 132 and/or the host processor 134 may execute instructions 156 retrieved from the system memory 144 (e.g., a dynamic random-access memory) and/or the mass storage 176 to implement aspects as described herein. For example, the graphics processor 132 and/or the host processor 134 may identify an AI model (e.g., a high-level code) for execution. The system 158 may partition and distribute subgraphs of the AI model to execute across the AI accelerators 148, graphics processor 132, host processor 134 and/or the one or more edge nodes. In some embodiments, the subgraphs may be first partitioned based on compute workloads of the AI model, and then re-partitioned based on the memory resources of the subgraphs and memory capacities of the graphics processor 132, host processor 134 and/or the one or more edge nodes.

When the instructions 156 are executed, the computing system 158 may implement one or more aspects of the embodiments described herein. For example, the system 158 may implement one or more aspects of the system 100 (FIG.

1), process 350 (FIGS. 2A-2B), method 800 (FIG. 3), method 400 (FIG. 4), method 420 (FIG. 5), method 450 (FIG. 6) and/or method 470 (FIG. 7) already discussed. The illustrated computing system 158 is therefore considered to implement new functionality and is performance-enhanced at least to the extent that it enables the computing system 158 to partition an AI model based on a granular and local analysis of memory and compute capacities of hardware devices and characteristics of the AI model. Thus, the subgraphs may be suited for low latency and efficient execution on the hardware devices.

FIG. 9 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, the system 100 (FIG. 1), process 350 (FIGS. 2A-2B), method 800 (FIG. 3), method 400 (FIG. 4), method 420 (FIG. 5), method 450 (FIG. 6) and/or method 470 (FIG. 7) already discussed. Thus, the logic 182 may generate a plurality of subgraphs based on computations associated with an AI model graph. The plurality of subgraphs corresponds to the AI model graph. The logic 182 then identifies memory capacities associated with a plurality of hardware devices and determines whether to readjust the plurality of subgraphs based on memory resources associated with the plurality of subgraphs and the memory capacities. The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 10:
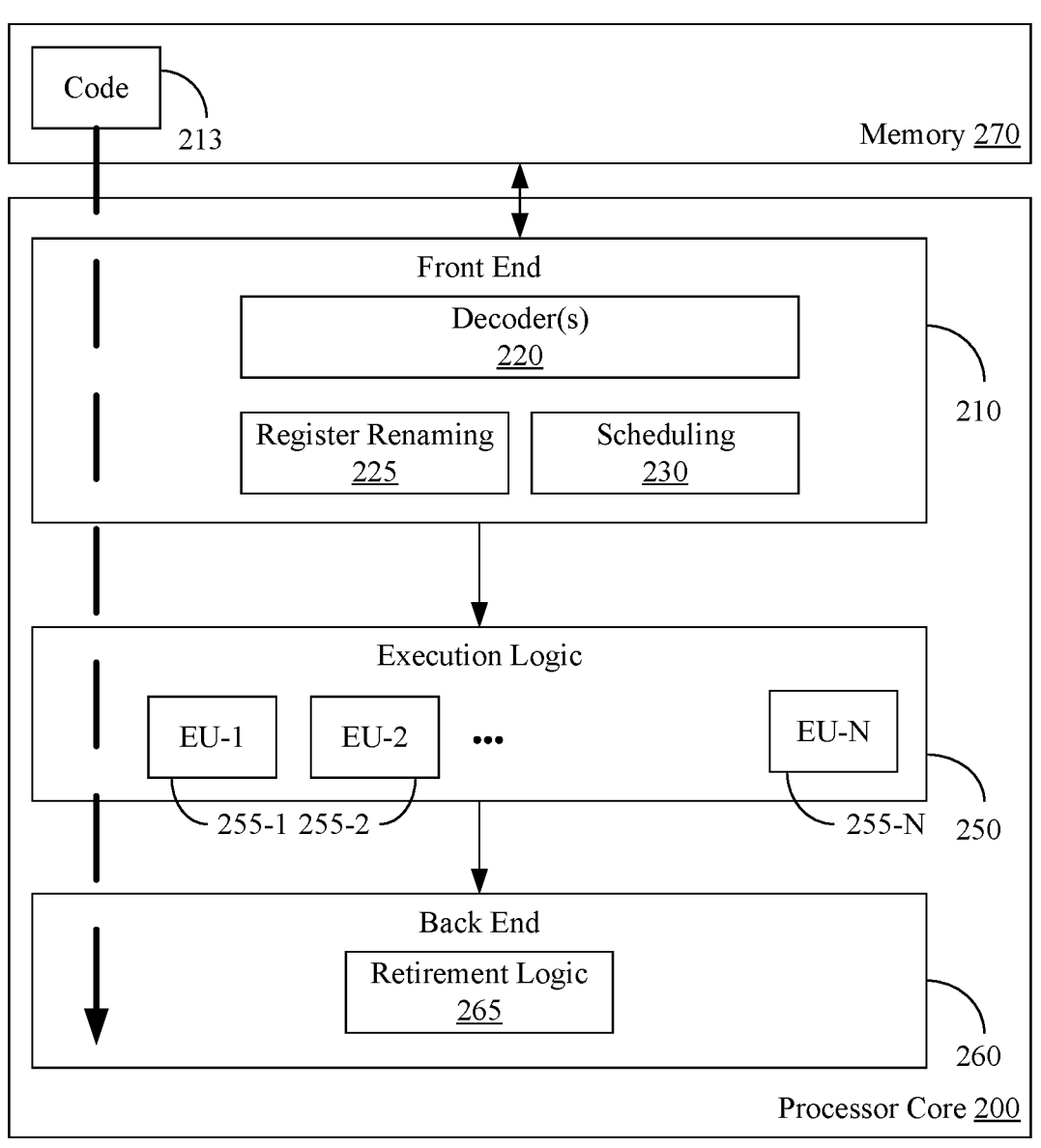
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the system 100 (FIG. 1), process 350 (FIGS. 2A-2B), method 800 (FIG. 3), method 400 (FIG. 4), method 420 (FIG. 5), method 450 (FIG. 6) and/or method 470 (FIG. 7) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
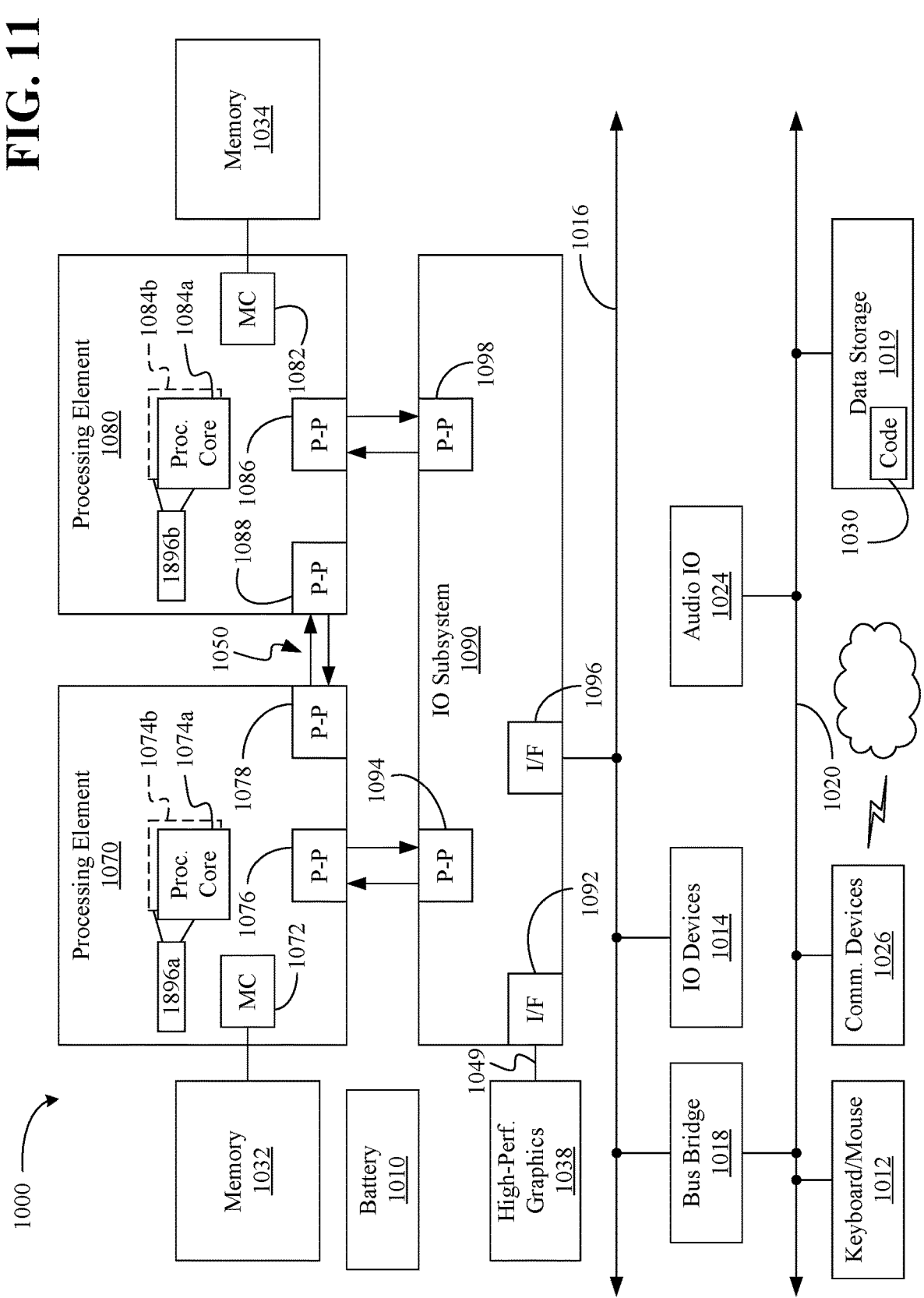
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the system 100 (FIG. 1), process 350 (FIGS. 2A-2B), method 800 (FIG. 3), method 400 (FIG. 4), method 420 (FIG. 5), method 450 (FIG. 6) and/or method 470 (FIG. 7) already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 includes a computing system comprising a network controller to communicate with one or more edge nodes that include a plurality of hardware devices, each hardware device being associated with memory capacity, a processor coupled to the network controller, and a memory coupled to the processor, the memory including a set of executable program instructions, which when executed by the processor, cause the computing system to convert an artificial intelligence (AI) model graph into an intermediate representation, partition the intermediate representation of the AI model graph into a plurality of subgraphs based on computations associated with the AI model graph, each subgraph being associated with one or more memory resources and one or more of the hardware devices, and determine whether to readjust the plurality of subgraphs based on the memory resources associated with the plurality of subgraphs and the memory capacities of the plurality of hardware devices.

Example 2 includes the computing system of Example 1, wherein the executable program instructions, when executed, cause the computing system to translate the AI model graph from a source dependent format to a source independent format to generate the intermediate representation, wherein the intermediate representation is to be in a hardware independent format Example 3 includes the computing system of Example 2, wherein the executable program instructions, when executed, cause the computing system to determine the computations and the memory resources of the plurality of subgraphs based on a plurality of layers identified from the intermediate representation.

Example 4 includes the computing system of Example 1, wherein the executable program instructions, when executed, cause the computing system to identify memory resources associated with execution of a first subgraph of the plurality of subgraphs, identify a first hardware device from the plurality of hardware devices that is scheduled to execute the first subgraph, and reduce the first subgraph based on the memory resources of the first subgraph being determined to exceed a first memory capacity of the first hardware device.

Example 5 includes the computing system of Example 4, wherein the executable program instructions, when executed, cause the computing system to determine a first portion of the first subgraph that has memory resources less than or equal to the first memory capacity, remove a second portion of the first subgraph from the first subgraph, and add the second portion to a second subgraph of the plurality of subgraphs.

Example 6 includes the computing system of any one of Examples 1 to 5, wherein the executable program instructions, when executed, cause the computing system to identify a total compute workload of the AI model graph based on the computations associated with the AI model graph, identify a compute value based on the total compute workload of the AI model graph divided by a total number of the plurality of subgraphs, and iteratively add layers to each respective subgraph of the plurality of subgraphs while a total compute workload of the respective subgraph is less than the compute value.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to convert an artificial intelligence (AI) model graph into an intermediate representation, partition the intermediate representation of the AI model graph into a plurality of subgraphs based on computations associated with the AI model graph, each subgraph being associated with one or more memory resources and one or more of a plurality of hardware devices, and determine whether to readjust the plurality of subgraphs based on the memory resources associated with the plurality of subgraphs and memory capacities of the plurality of hardware devices Example 8 includes the apparatus of Example 7, wherein the logic coupled to the one or more substrates is to translate the AI model graph from a source dependent format to a source independent format to generate the intermediate representation, wherein the intermediate representation is to be in a hardware independent format.

Example 9 includes the apparatus of Example 8, wherein the logic coupled to the one or more substrates is to determine the computations and the memory resources of the plurality of subgraphs based on a plurality of layers identified from the intermediate representation.

Example 10 includes the apparatus of Example 7, wherein the logic coupled to the one or more substrates is to identify memory resources associated with execution of a first subgraph of the plurality of subgraphs, identify a first hardware device from the plurality of hardware devices that is scheduled to execute the first subgraph, and reduce the first subgraph based on the memory resources of the first subgraph being determined to exceed a first memory capacity of the first hardware device.

Example 11 includes the apparatus of Example 10, wherein the logic coupled to the one or more substrates is to determine a first portion of the first subgraph that has memory resources less than or equal to the first memory capacity, remove a second portion of the first subgraph from the first subgraph, and add the second portion to a second subgraph of the plurality of subgraphs.

Example 12 includes the apparatus of any one of Examples 7 to 11, wherein the logic coupled to the one or more substrates is to identify a total compute workload of the AI model graph based on the computations associated with the AI model graph, identify a compute value based on the total compute workload of the AI model graph divided by a total number of the plurality of subgraphs, and iteratively add layers to each respective subgraph of the plurality of subgraphs while a total compute workload of the respective subgraph is less than the compute value.

Example 13 includes the apparatus of any one of Examples 7 to 11, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to convert an artificial intelligence (AI) model graph into an intermediate representation, partition the intermediate representation of the AI model graph into a plurality of subgraphs based on computations associated with the AI model graph, each subgraph being associated with one or more memory resources and one or more of a plurality of hardware devices, and determine whether to readjust the plurality of subgraphs based on the memory resources associated with the plurality of subgraphs and memory capacities of the plurality of hardware devices.

Example 15 includes the at least one computer readable storage medium of Example 14, wherein the executable program instructions, when executed, further cause the computing system to translate the AI model graph from a source dependent format to a source independent format to generate the intermediate representation, wherein the intermediate representation is to be in a hardware independent format.

Example 16 includes the at least one computer readable storage medium of Example 15, wherein the executable program instructions, when executed, further cause the computing system to determine the computations and the memory resources of the plurality of subgraphs based on a plurality of layers identified from the intermediate representation.

Example 17 includes the at least one computer readable storage medium of Example 14, wherein the executable program instructions, when executed, further cause the computing system to identify memory resources associated with execution of a first subgraph of the plurality of subgraphs, identify a first hardware device from the plurality of hardware devices that is scheduled to execute the first subgraph, and reduce the first subgraph based on the memory resources of the first subgraph being determined to exceed a first memory capacity of the first hardware device.

Example 18 includes the at least one computer readable storage medium of Example 17, wherein the executable program instructions, when executed, further cause the computing system to determine a first portion of the first subgraph that has memory resources less than or equal to the first memory capacity, remove a second portion of the first subgraph from the first subgraph, and add the second portion to a second subgraph of the plurality of subgraphs.

Example 19 includes the at least one computer readable storage medium of any one of Examples 14 to 18, wherein the executable program instructions, when executed, further cause the computing system to identify a total compute workload of the AI model graph based on the computations associated with the AI model graph, identify a compute value based on the total compute workload of the AI model graph divided by a total number of the plurality of subgraphs, and iteratively add layers to each respective subgraph of the plurality of subgraphs while a total compute workload of the respective subgraph is less than the compute value.

Example 20 includes a method comprising converting an artificial intelligence (AI) model graph into an intermediate representation, partitioning the intermediate representation of the AI model graph into a plurality of subgraphs based on computations associated with the AI model graph, each subgraph being associated with one or more memory resources and one or more of a plurality of hardware devices, and determining whether to readjust the plurality of subgraphs based on the memory resources associated with the plurality of subgraphs and memory capacities of the plurality of hardware devices.

Example 21 includes the method of Example 20, further comprising translating the AI model graph from a source dependent format to a source independent format to generate the intermediate representation, wherein the intermediate representation is in a hardware independent format.

Example 22 includes the method of Example 21, further comprising determining the computations and the memory resources of the plurality of subgraphs based on a plurality of layers identified from the intermediate representation.

Example 23 includes the method of Example 20, further comprising identifying memory resources associated with execution of a first subgraph of the plurality of subgraphs, identifying a first hardware device from the plurality of hardware devices that is scheduled to execute the first subgraph, and reducing the first subgraph based on the memory resources of the first subgraph being determined to exceed a first memory capacity of the first hardware device.

Example 24 includes the method of Example 23, further comprising determining a first portion of the first subgraph that has memory resources less than or equal to the first memory capacity, removing a second portion of the first subgraph from the first subgraph, and adding the second portion to a second subgraph of the plurality of subgraphs.

Example 25 includes the method of any one of Examples 20 to 24, further comprising identifying a total compute workload of the AI model graph based on the computations associated with the AI model graph, identifying a compute value based on the total compute workload of the AI model graph divided by a total number of the plurality of subgraphs, and iteratively adding layers to each respective subgraph of the plurality of subgraphs while a total compute workload of the respective subgraph is less than the compute value.

Example 26 includes a semiconductor apparatus comprising means for converting an artificial intelligence (AI) model graph into an intermediate representation, means for partitioning the intermediate representation of the AI model graph into a plurality of subgraphs based on computations associated with the AI model graph, each subgraph being associated with one or more memory resources and one or more of a plurality of hardware devices, and means for determining whether to readjust the plurality of subgraphs based on the memory resources associated with the plurality of subgraphs and memory capacities of the plurality of hardware devices.

Example 27 includes the apparatus of example 26, further comprising means for translating the AI model graph from a source dependent format to a source independent format to generate the intermediate representation, wherein the intermediate representation is in a hardware independent format.

Example 28 includes the apparatus of example 27, further comprising means for determining the computations and the memory resources of the plurality of subgraphs based on a plurality of layers identified from the intermediate representation.

Example 29 includes the apparatus of example 26, further comprising means for identifying memory resources associated with execution of a first subgraph of the plurality of subgraphs, means for identifying a first hardware device from the plurality of hardware devices that is scheduled to execute the first subgraph, and means for reducing the first subgraph based on the memory resources of the first subgraph being determined to exceed a first memory capacity of the first hardware device.

Example 30 includes the apparatus of example 29, further comprising means for determining a first portion of the first subgraph that has memory resources less than or equal to the first memory capacity, means for removing a second portion of the first subgraph from the first subgraph, and means for adding the second portion to a second subgraph of the plurality of subgraphs.

Example 31 includes the apparatus of any one of examples 26 to 30, further comprising means for identifying a total compute workload of the AI model graph based on the computations associated with the AI model graph, means for identifying a compute value based on the total compute workload of the AI model graph divided by a total number of the plurality of subgraphs, and means for iteratively adding layers to each respective subgraph of the plurality of subgraphs while a total compute workload of the respective subgraph is less than the compute value.

Thus, technology described herein may provide for generating subgraphs based on memory capacities of hardware devices. Doing so may enhance execution particularly in resource constrained systems where subgraphs are unable to be easily reallocated.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller to communicate with one or more edge nodes that include a plurality of hardware devices, each hardware device having a memory capacity;
a processor coupled to the network controller; and
a memory coupled to the processor, the memory including a set of executable program instructions, which when executed by the processor, cause the computing system to:
convert an artificial intelligence (AI) model graph into an intermediate representation, wherein the intermediate representation is hardware independent;
determine computations associated with the AI model graph based on a plurality of layers identified from the intermediate representation, wherein a layer is a node of the AI model graph;
partition the intermediate representation of the AI model graph into a plurality of subgraphs based on the computations, the subgraphs being associated with subgraph memory resources and the plurality of hardware devices;
determine whether to re-adjust the plurality of subgraphs based on the subgraph memory resources associated with the plurality of subgraphs and the memory capacities of the plurality of hardware devices;
identify a total compute workload of the AI model graph based on the computations associated with the AI model graph;
identify a compute value based on the total compute workload of the AI model graph divided by a total number of the plurality of subgraphs; and
iteratively add layers to each respective subgraph of the plurality of subgraphs while a total compute workload of the respective subgraph is less than the compute value.

2. The computing system of claim 1, wherein the executable program instructions, when executed, cause the computing system to:
translate the AI model graph from a source dependent format to a source independent format to generate the intermediate representation.

3. The computing system of claim 1, wherein the executable program instructions, when executed, cause the computing system to:
identify first memory resources of the subgraph memory resources associated with execution of a first subgraph of the plurality of subgraphs;
identify a first hardware device from the plurality of hardware devices that is scheduled to execute the first subgraph; and

23 reduce the first subgraph based on the first memory resources associated with the first subgraph being determined to exceed a first memory capacity of the first hardware device.

4. The computing system of claim 3, wherein the executable program instructions, when executed, cause the computing system to:

determine a first portion of the first subgraph that has first portion memory resources of the first memory resources less than or equal to the first memory capacity;

remove a second portion of the first subgraph from the first subgraph; and add the second portion to a second subgraph of the plurality of subgraphs.

5. A semiconductor apparatus comprising:

one or more substrates; and logic coupled to the one or more substrates, wherein the logic is implemented in one or more of configurable logic or fixed-functionality logic hardware, the logic coupled to the one or more substrates to:

convert an artificial intelligence (AI) model graph into an intermediate representation, wherein the intermediate representation is hardware independent;

determine computations associated with the AI model graph based on a plurality of layers identified from the intermediate representation, wherein a layer is a node of the AI model graph;

partition the intermediate representation of the AI model graph into a plurality of subgraphs based on the computations, the subgraphs being associated with the subgraph memory resources and a plurality of hardware devices;

determine whether to readjust the plurality of subgraphs based on the subgraph memory resources associated with the plurality of subgraphs and memory capacities of the plurality of hardware devices;

identify a total compute workload of the AI model graph based on the computations associated with the AI model graph;

identify a compute value based on the total compute workload of the AI model graph divided by a total number of the plurality of subgraphs; and iteratively add layers to each respective subgraph of the plurality of subgraphs while a total compute workload of the respective subgraph is less than the compute value.

6. The apparatus of claim 5, wherein the logic coupled to the one or more substrates is to:

translate the AI model graph from a source dependent format to a source independent format to generate the intermediate representation.

7. The apparatus of claim 5, wherein the logic coupled to the one or more substrates is to:

identify first memory resources of the subgraph memory resources associated with execution of a first subgraph of the plurality of subgraphs;

identify a first hardware device from the plurality of hardware devices that is scheduled to execute the first subgraph; and reduce the first subgraph based on the first memory resources associated with the first subgraph being determined to exceed a first memory capacity of the first hardware device.

8. The apparatus of claim 7, wherein the logic coupled to the one or more substrates is to:

24 determine a first portion of the first subgraph that has first portion memory resources of the first memory resources less than or equal to the first memory capacity;

remove a second portion of the first subgraph from the first subgraph; and add the second portion to a second subgraph of the plurality of subgraphs.

9. The apparatus of claim 5, wherein the logic coupled to the one or more substrates includes transistor channel regions that are positioned within the one or more substrates.

10. At least one non-transitory computer readable storage medium comprising a set of executable program instructions, which when executed by a computing system, cause the computing system to:

convert an artificial intelligence (AI) model graph into an intermediate representation, wherein the intermediate representation is hardware independent;

determine computations associated with the AI model graph based on a plurality of layers identified from the intermediate representation, wherein a layer is a node of the AI model graph;

partition the intermediate representation of the AI model graph into a plurality of subgraphs based on the computations, the subgraphs being associated with the subgraph memory resources and a plurality of hardware devices;

determine whether to readjust the plurality of subgraphs based on the subgraph memory resources associated with the plurality of subgraphs and memory capacities of the plurality of hardware devices;

identify a total compute workload of the AI model graph based on the computations associated with the AI model graph;

identify a compute value based on the total compute workload of the AI model graph divided by a total number of the plurality of subgraphs; and iteratively add layers to each respective subgraph of the plurality of subgraphs while a total compute workload of the respective subgraph is less than the compute value.

11. The at least one non-transitory computer readable storage medium of claim 10, wherein the executable program instructions, when executed, further cause the computing system to:

translate the AI model graph from a source dependent format to a source independent format to generate the intermediate representation.

12. The at least one non-transitory computer readable storage medium of claim 10, wherein the executable program instructions, when executed, further cause the computing system to:

identify first memory resources of the subgraph memory resources associated with execution of a first subgraph of the plurality of subgraphs;

identify a first hardware device from the plurality of hardware devices that is scheduled to execute the first subgraph; and reduce the first subgraph based on the first memory resources associated with the first subgraph being determined to exceed a first memory capacity of the first hardware device.

13. The at least one non-transitory computer readable storage medium of claim 12, wherein the executable program instructions, when executed, further cause the computing system to:

25 determine a first portion of the first subgraph that has first portion memory resources of the first memory resources less than or equal to the first memory capacity;

remove a second portion of the first subgraph from the first subgraph; and add the second portion to a second subgraph of the plurality of subgraphs.

14. A method comprising:

converting an artificial intelligence (AI) model graph into an intermediate representation, wherein the intermediate representation is hardware independent;

determining computations associated with the AI model graph based on a plurality of layers identified from the intermediate representation, wherein a layer is a node of the AI model graph;

partitioning the intermediate representation of the AI model graph into a plurality of subgraphs based on the computations, the subgraphs being associated with the subgraph memory resources and a plurality of hardware devices;

determining whether to readjust the plurality of subgraphs based on the subgraph memory resources associated with the plurality of subgraphs and memory capacities of the plurality of hardware devices;

identifying a total compute workload of the AI model graph based on the computations associated with the AI model graph;

identifying a compute value based on the total compute workload of the AI model graph divided by a total number of the plurality of subgraphs; and

26 iteratively adding layers to each respective subgraph of the plurality of subgraphs while a total compute workload of the respective subgraph is less than the compute value.

15. The method of claim 14, further comprising:

translating the AI model graph from a source dependent format to a source independent format to generate the intermediate representation.

16. The method of claim 14, further comprising:

identifying first memory resources of the subgraph memory resources associated with execution of a first subgraph of the plurality of subgraphs;

identifying a first hardware device from the plurality of hardware devices that is scheduled to execute the first subgraph; and reducing the first subgraph based on the first memory resources associated with the first subgraph being determined to exceed a first memory capacity of the first hardware device.

17. The method of claim 16, further comprising:

determining a first portion of the first subgraph that has first portion memory resources of the first memory resources less than or equal to the first memory capacity;

removing a second portion of the first subgraph from the first subgraph; and adding the second portion to a second subgraph of the plurality of subgraphs.

* * * * *